United States Patent [19]
Baker

[11] 4,119,980
[45] Oct. 10, 1978

[54] PRISM CAMERA

[75] Inventor: James G. Baker, Winchester, Mass.

[73] Assignee: Polaroid Corporation, Cambridge, Mass.

[21] Appl. No.: 720,008

[22] Filed: Sep. 2, 1976

[51] Int. Cl.² ............................................. G03B 15/00
[52] U.S. Cl. ................................................... 354/150
[58] Field of Search ............... 354/150, 152, 153, 154, 354/155, 156, 157, 158

[56] References Cited
U.S. PATENT DOCUMENTS
3,818,498 6/1974 Zehrpfennig ........................ 354/150

Primary Examiner—Donald A. Griffin
Attorney, Agent, or Firm—David R. Thornton

[57] ABSTRACT

A compact, rigid camera for use with self-developing film utilizes a prism element having an exit face overlying the film and which is both reflective and transmissive to fold the optical path of useful light rays between an objective lens and a film plane in a relatively small volume. A prism entrance face is oriented with respect to the reflective/transmissive exit face so that entering light is totally internally reflected at the exit face to at least two other faces of the prism which are reflective and oriented to return the light to the exit face substantially along its perpendicular. The exit face is coextensive with the film plane so that the reflected light transmitted through the exit face exposes the film. In one form the exit face of the prism is planar and closely spaced from the film plane. In another form the exit face has two mutually inclined planar surfaces, each of which internally reflects one image beam and transmits another beam internally reflected from the other face. In the latter form an auxiliary emergent prism is interposed between the exit face reflective/transmissive surfaces and the film plane.

6 Claims, 8 Drawing Figures

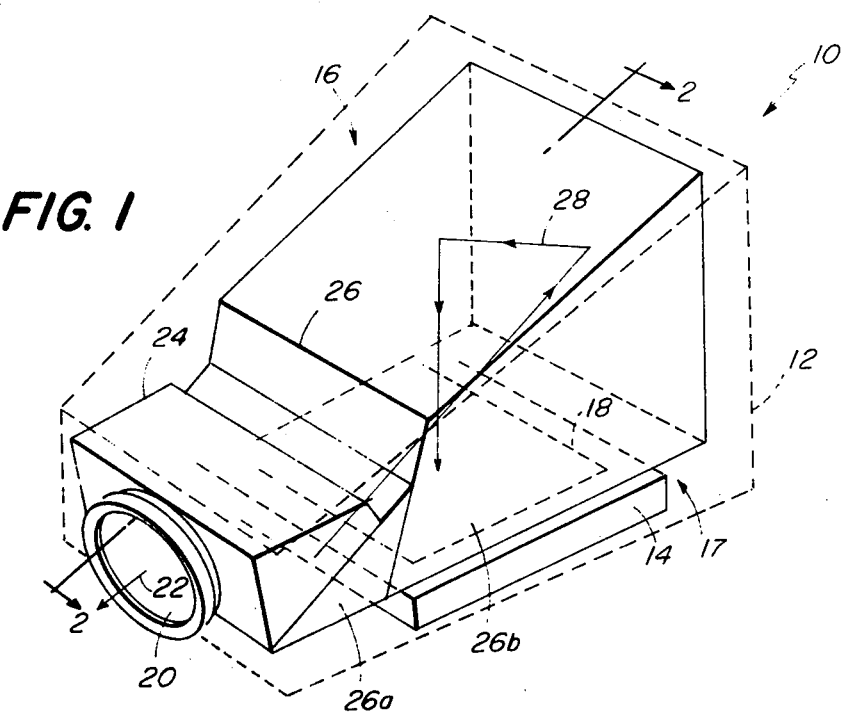
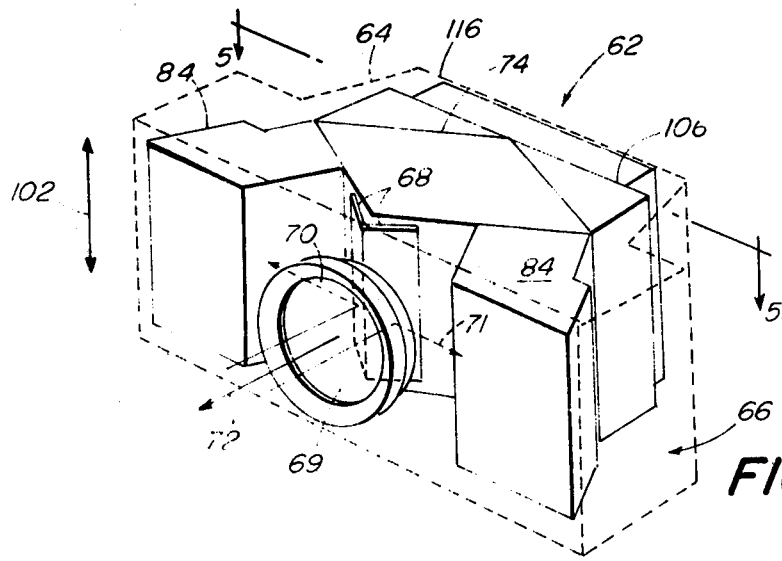

PRISM CAMERA

BACKGROUND OF THE INVENTION

This invention relates in general to photographic apparatus and in particular to rigid, compact cameras for use with self-developing film.

Conventional snapshot cameras derive compactness principally from the use of film having a relatively small frame format and, in some instances, from a collapsing bellows arrangement. For 35 millimeter cameras, the film frame is typically 24 millimeters by 36 millimeters. Since the focal length of the objective lens of the camera is usually at least as long as the diagonal of the film frame to provide a useful angular field, the lens-to-film plane distance would then be of the order of 43 millimeters (approximately 1 and 11/16 inches). (Of course, wide angle lenses for 35 millimeter cameras can have a significantly shorter focal length). In conventional cameras where the light from the lens follows a straight path in air to the film, the focal length is therefore a controlling limitation on the front to back dimension of the camera. A feature of this construction is that there is room for only one or two optically active surfaces between the lens and the film which can reflect or scatter light. This and the relatively small film format reduce the likelihood that stray light from outside the angular field of the lens, or other unwanted light, will reach the film.

The difficulties in achieving a camera having a compact size are greatly increased when the camera uses self-developing film, such as that marketed by the Polaroid Corporation. While in conventional photography, a relatively small negative can produce a relatively large print or viewable image by enlargement or projection, the exposed photographic area on self-developing film must be the same as that of the actual developed print. As a result, instant cameras, i.e. designed for use with self-developing film, generally have a significantly longer focal length than that found in compact cameras using conventional film. Also, instant cameras generally require a fairly high speed lens to provide sufficient light to expose the film at exposure times useful in hand-held cameras for general purposes. These requirements of self-developing film therefore present significant constraints on the design of a compact camera.

Early solutions to the problem of achieving compactness in an instant camera involved mechanical folding arrangements to move the objective lens in a direction perpendicular to the film plane. A folding bellows encloses the camera space between the objective lens and the film plane. More recently, cameras developed and marketed by the Polaroid Corporation utilize a reflective element in the exposure chamber to fold the optical path between the lens and the film plane. A collapsible version of such a camera which achieves a high degree of compactness is described in U.S. Pat. No. 3,753,392. Another instant camera of this type which employs a reflective element is described in U.S. Pat. No. 3,938,167 and U.S. Pat. No. 3,940,774. This camera is noncollapsible, or rigid, and therefore has a lower cost of manufacture than the collapsible camera, but suffers from a comparatively bulky, cumbersome configuration.

U.S. Pat. No. 3,818,498 to Zehnpfennig discloses a compact camera designed for self-developing film which employs a pair of spaced apart, mutually inclined reflective elements to generate a multiply-folded optical path. One of the elements is fully reflective, while the other is partially reflective. The partially reflective element overlies a selector element formed of mechanical light collimators held in a transparent medium and which overlies the film. While this arrangement may achieve a highly folded optical path, it nevertheless suffers from several disadvantages. First, at least a portion of the light reaching the film plane undergoes multiple reflections from the partially reflective element. At each reflection the incident light looses a significant portion of its intensity. As a result, the intensity of the light reaching the film plane is generally low and of varying values depending on the number of reflections the light has undergone. Another problem is that use of mechanical collimators in the selector element and their location direction over the film plane causes them to cast a shadow on the film, or produce granularity, or defocus, or some other form of image degradation.

While the light folding properties of prisms are well known, the principal uses of prisms have been in non-photographic optical instruments such as binoculars, telescopes, periscopes, rangefinders and spectrometers. Many applications rely on the ability of a prism to redirect by total internal reflection light incident on a surface adjacent a medium of a lower index of refraction at an angle greater than a critical angle. Common prisms which utilize this property are the Porro prisms (of first or second kinds) commonly employed in binoculars. Other common prism configurations such as Dove, Lehman, and Amici prisms also use total internal reflection for image inversion, field rotation or scanning. In these applications while the incident light beam is reflected one or more times, and hence is to some extent "folded", the main purposes of the prism element are not to fold the optical path to achieve compactness, but rather to redirect, laterally displace, invert, split, combine or rotate the beam or beams.

Another prism utilizing multiple internal reflections is the so-called Schmidt prism. One characteristic of the Schmidt prism is that a portion of one prism face can provide total internal reflection while another portion is transmissive. Schmidt prisms, singly and in matched pairs, have also found applications in optical instruments. A discussion of some applications can be found in applicant's article "Optical Systems for Telescopes and Binoculars" at pp. 435–471 of *Summary of Technical Report of Division* 16, *NDRC, Volume* 1, *Optical Instruments* (Wash. D.C. 1946). U.S. Pat. No. 3,417,685 to Kato et al discloses a matched pair of Schmidt prisms operating as a field rotator in a microscope. In Kato, as is common with optical instruments such as telescopes and periscopes, photographic apparatus can be attached to the eyepiece to record the output image of the instrument.

Heretofore, prisms have been used in cameras principally as image directing elements in viewfinders. For example, many 35 millimeter single lens reflex cameras employ a roof pentaprism to direct light from a deviating mirror to the viewfinder eyepiece. U.S. Pat. No. 3,819,255 to Matui discloses a more complex viewfinder structure employing an opposed pair of Schmidt prisms that are mutually rotatable about a fixed pivot with an air gap separating the opposed faces. A portion of each opposed face internally reflects the incident light beam and another portion transmits or receives the light beam. It is noteworthy, however, that the light transmission through these prisms is over a relatively small portion of the opposed prism faces. Further, the light transmission to a viewfinder does not require the optical quality or transmission efficiency necessary for light transmission to photographic film. Also, unwanted or stray light, and the loss of light intensity, are not as critical in viewfinder optics as in the image-path optics of the camera.

U.S. Pat. No. 3,784,645 to Grey and U.S. Pat. No. 3,911,692 to Grey et al disclose prism elements located within the exposure chamber of a camera and forming part of the optical path between the objective lens and the film plane. More specifically, these patents teach that prism elements are disposed in a stereoscopic camera to laterally displace two light beams each originating at separate objective lenses so that they are recomposed in a side by side relationship on two halves of a single film frame. This displacement function is roughly analogous to that of roof prism pairs in binoculars. These patents also deal with numerous optical design problems generated by the prism elements, including such prism characteristics as distortion, astigmatism, chromatic aberration, spherical aberration, light absorption, the weight of the prism elements, and the elimination and/or control of stray light. Another design consideration is that the use of prisms in cameras increases the back focal distance for a given focal length. The ability of the prism to fold the optical path, particularly with a high index prism, however, can more than offset this increase. It should also be noted, however, that this "foldability" does not necessarily result in compactness.

In particular, these disclosures teach the desirability of spacing the exit face of the prism at a practical distance from the film plane in order to avoid abrasion and to avoid having dust or other irregularities present on the face of the prism cast a shadow on the film. The large spacing also has the advantage of allowing the use of prisms having a smaller size, which in turn reduces the absorption of the light within the prism and reduces the weight which the prism elements add to the overall optical system.

It is also clear from these disclosures that a material such as glass with a relatively high index of refraction, typically 1.6 or 1.7, is preferable compared to a plastic material—typically with an index of refraction only near 1.5—both in terms of optical efficiency and of "foldability."

With this state of the art, it is a principal object of this invention to provide a camera suitable for use with self-developing film and which is both rigid and compact.

Another object of the invention is to provide a compact, rigid instant camera having a highly folded optical path between the objective lens and the film plane and having an improved level of image brightness and uniform light distribution.

A further object of the invention is to provide a compact, rigid camera that utilizes a prism element of plastic material to attain a comparatively low weight and low cost manufacture.

Another object of the invention is to provide a compact instant camera which accommodates an objective lens having a sufficiently long focal length to take quality portrait photographs.

A further object of the invention is to provide a compact instant camera that allows flexibility in the alignment of the optical axis of the objective lens with respect to the film plane, and in the location and design of other components.

SUMMARY OF THE INVENTION

A compact, rigid camera embodying the invention has a beam-folding prism disposed in its exposure chamber to define at least part of the optical path between the objective lens and the film plane. An exit face of the prism that is both reflective and transmissive is coextensive with and selectively spaced from the film plane. Light rays from within the angular field of the objective lens enter the prism at an entrance face that is oriented with respect to the exit face so that the entering useful light is totally internally reflected at the exit face. At least two other prism faces are reflective and oriented to return the internally reflected light to the exit face substantially along its perpendicular. Preferably at least one additional optical element, such as a multiply-reflecting prism, is in optical alignment between the objective lens and the folding prism to provide an optimum orientation and location of the lens and of the rays incident on the entrance face of the folding prism.

In one embodiment, the prism exit face is planar and closely spaced from the film plane. In another form, suitable for a split aperture camera, the exit face has two planar surfaces mutually inclined along the center line of the film plane. Each surface of the exit face is transmissive to light totally internally reflected from the other surface of the exit face. In this embodiment an emergent prism is interposed between and closely spaced from the exit face and the film plane.

These and other features and objects of the invention will be more fully understood from the following detailed description of preferred embodiments and the accompanying drawings.

BRIEF DESCRIPTION OF THE DRAWINGS

FIG. 1 is a simplified perspective view of a compact, rigid prism camera according to the invention;

FIG. 4 is a simplified perspective view of another compact, rigid camera according to the invention employing split field and split aperture;

DETAILED DESCRIPTION OF THE ILLUSTRATED EMBODIMENTS

Figure 2:
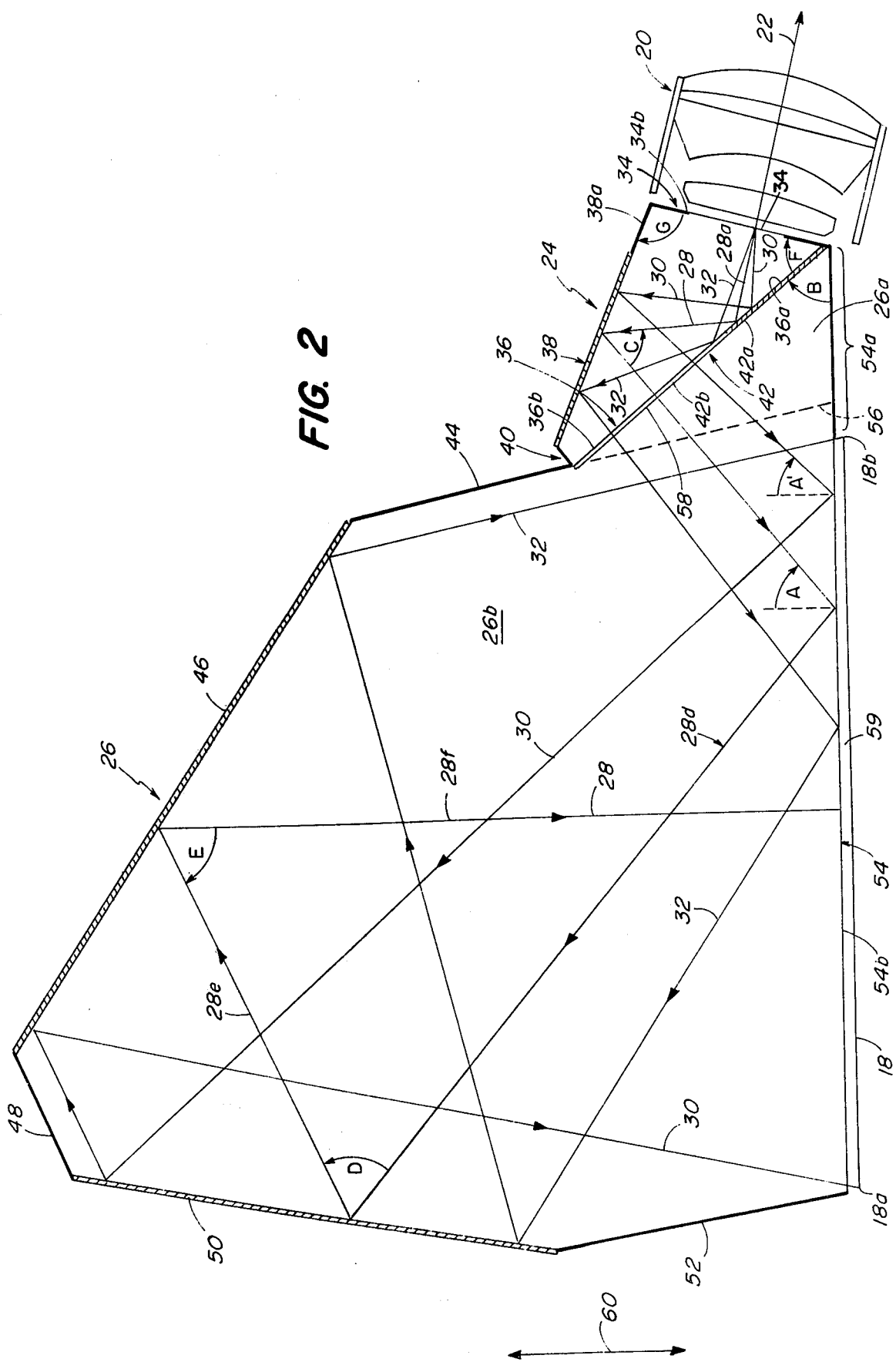
FIG. 2 is a view in vertical section taken along line 2—2 of FIG. 1 and showing the prism elements within the camera and the highly folded optical path they provide.

With reference to FIG. 1, a camera 10 according to the invention has a relatively thin, rigid housing 12 that is light tight except at selected openings and that supports the various optical and mechanical elements. The housing forms an exposure chamber 16 and a compartment 17 for supporting, along one wall of this chamber, a cassette 14 of self-developing film units. The cassette 14 and the film units in it are preferably of the type presently available for the camera marketed by the Polaroid Corporation under the registered designation SX-70. The uppermost film unit in the pack is presented for exposure with its upper light sensitive surface lying in and coextensive with a film plane 18.

An objective lens 20 mounted on the housing 12 collects light from within an angular field in object space and forms an exit pupil or bundle of useful light rays in image or camera space which comes to focus in an image plane substantially coincident with the film plane 18. While the objective lens 20 is referred to as a single lens, it typically is a series of optical elements aligned along a common optical axis indicated generally by the arrow 22. These elements correct aberrations introduced both within the lens 20 itself and by other optical elements discussed below.

The camera 10 and other embodiments of the invention described below typically include other elements which for clarity of description are not shown. These elements, which may be of conventional design, include a shutter, a viewfinder, focus adjustment means, means for controlling the movement of the film units from the film cassette 14, and means for initiating development of the film units. Suitable new constructions for some of these elements are described in the following co-pending commonly assigned U.S. patent applications of Lawrence M. Douglas filed on even date herewith: "Selective Closure of Camera Viewfinder And Camera Incorporating Same, Ser. No. 720,047" "Compact Self-Developing Camera With Folded Optical Image Path, Ser. No. 720,054" "Film Advance Mechanisms, Ser. No. 720,007 and " and "Compact Camera With Movable Film Drive And Optical Unit, Ser. No. 720,006" the disclosures of which are herewith incorporated by reference.

With reference to FIGS. 1 and 2, the camera 10 has prisms 24 and 26 housed in the exposure chamber 16 and which define the optical path between the objective lens and the film plane 18. This optical path is depicted by the chief or principal ray 28 of the diverging bundle of useful light rays in the exit pupil of the lens 20 and transmitted through the prisms 24 and 26 and by two extreme rays 30 and 32 at the periphery of the bundle. The prism 24, and more particularly the prism 26, fold the optical path numerous times within a relatively small, compact volume.

As shown in FIG. 2, the prism 24 has an entrance face 34, a reflective and transmissive face 36, a reflective and absorptive face 38 and an absorptive face 40. The faces 34, 36 and 38 each have portions with optically different properties which define and control the optical path. The entrance face 34 forms an entrance window 34a, that is preferably optically finished (a "clear polish" finish) and is coated for low reflection. Around this entrance window the face 34 preferably has a surrounding portion 34b that is optically absorptive. The exit face 36 of the prism has a reflective portion 36a in optical alignment with the entrance windows 34a and offset therefrom has a clear, transmissive exit portion 36b. Exit face 36 and adjacent face 42 of prism 26 can be coated with anti-reflection films. The reflective face 38 aligned opposite the face 36 has an absorptive portion 38a outside the optical path, i.e. adjacent the face 34. The absorptive face 40 extends between the faces 36 and 38.

The prism 26 has, in adjacent sequence, an entrance face 42, an absorptive face 44, a reflective face 46, an absorptive face 48, a reflective face 50, an absorptive face 52, and an exit face 54. Entrance face 42 is separated from exit face 36 of prism 24 by a thin air space 58. The exit face 54 has an absorptive portion 54a adjacent the entrance face 42 and a clear polished portion 54b which overlies and is closely spaced from the film plane 18. Portion 54b can be coated with an anti-reflection film to increase efficiency and to reduce ghost reflections. Each of the optically active faces of the prisms 24 and 26 is preferably flat, particularly the reflective surfaces, to avoid image distortions. The absorptive faces and face portions of the prisms 24 and 26 can be rendered absorptive by coating them with conventional material that absorbs white light and adheres to the glass or plastic material forming the prisms. A black index-matching paint is preferred since it enhances the transmission of light from within the prism to the absorptive materials dispersed in the paint, particularly at large incidence angles. The lateral faces of the prisms not shown in FIG. 2, i.e. which extend transverse to the faces shown and longitudinal to the plane of the drawing, are also preferably coated with an absorptive material. The reflective faces and face portions are formed using standard techniques by coatings that form front surface optical reflectors.

While the prism 26 can be formed from a single block of material, it is preferably formed from a minor segment 26a of triangular section in the plane of FIG. 2, joined to a major segment 26b by an index-matching cement along the interface which is designated with a dashed line 56. The prisms 24 and 26 are positioned with the thin air gap 58 between the light transmitting surface portions 36b and 42b. The air gap 58 must have a thickness of at least several wavelengths to avoid interference effects, and is preferably in the range of 0.025 millimeter (0.001 inch).

The transmission of light along the optical path through the prisms 24 and 26 can be considered with reference to the chief ray 28. The ray 28 enters the prism at the entrance window 34a along its perpendicular. While some deviation from the perpendicular is permissible, in general increases in the angle of incidence (measured from the perpendicular or normal) tend to reduce the transmission of light energy into the prisms and to introduce image distortions which become increasingly difficult to correct. Within the prism, the ray is reflected from the reflective surface 36a to the face 38 where it reflects to the exit face portion 36b substantially along its perpendicular. The ray emerges from the prism 24, traverses the air gap 58, and enters the prism 26 at the entrance face portion 42b along its perpendicular.

Within the prism 26, the ray is directed, in succession, obliquely to face 54, reflected to face 50, reflected to face 46 and reflected back to face 54, from which it exits the prism. A principal feature of the invention is the exit face portion 54b which first reflects and then transmits the light rays following the optical path of the camera. The ray 28 strikes the face portion 54b at an angle of incidence A that exceeds the critical angle so that the ray is totally internally reflected within the prism 26. The reflective faces 50 and 46 then successively reflect the ray and direct it back onto the exit face portion 54b at a substantially perpendicular angle of incidence. The ray accordingly is transmitted essentially undisturbed through the face portion 54b, and traverses an air gap 59 to strike the film plane 18, where it exposes a film unit. While the ray 28 is reflected back into the prism 26 at faces 54, 50 and 46 the phrase "internally reflected" for the purposes of this description is limited to total internal reflection as distinguished from standard from surface reflection from a mirror-like surface. While the gap 59 is preferably of uniform thickness, the exit face 54 can be inclined with respect to the film plane to yield a wedge shaped gap. In either case, the gap should be wide enough at all points to avoid abrasion of the exit face by the film but narrow enough to avoid magnification of image aberrations or foreign matter on the exit face. A recommended minimum width is approximately 0.7 millimeter.

The overall height of the prism 26 measured in a direction perpendicular to the film plane 18, indicated by the arrow 60, is substantially less than the maximum linear dimension of the film plane, typically its diagonal. For a film unit having an 80 millimeter by 80 millimeter format, this maximum dimension is approximately 112 millimeters. For this film, and when made with a material having an index of refraction of approximately 1.5, the maximum height of the prism 26 as shown is approximately 93 millimeters. The camera 10 is also compact in its longitudinal and lateral directions since the exit face 54b of the prism 26 typically is only slightly longer than the film plane 18 which it overlies. The relative narrowness, i.e. dimension transverse to the plane of FIG. 2, of the prism 26 is significant since in general it is much more difficult to fold a wide, diverging beam of light than a similar narrow beam of light. The dimensions of the prism must, nevertheless, be sufficiently large to avoid vignetting.

While for a given film format, prism material and objective lens, tracing the chief ray 28 is a valuable design tool, it is also necessary to consider the action of the prism on the extreme rays 30 and 32 which strike the film plane at its opposite lateral edges 18a and 18b, respectively. A particularly important consideration is that the angle of incidence A' of the ray 30 on the face portion 54b is equal to or exceeds the critical angle of the prism material so that the ray 30 is not lost by transmission through the face 54b, particularly since such transmission would expose the underlying film. In order to have the angle A' at least equal to the critical angle, the angle A associated with the chief ray must be at least equal to the critical angle plus the sum of the chief ray half-angle in image space in the medium and the convergence half-angle in the medium. The chief ray half-angle can be viewed as the angular difference, in image space, in the direction between the optical axis 22 of the lens 20 and the ray in the medium passing obliquely through the center of the lens and striking the film plane at the same edge 18a as the ray 30. The convergence half-angle is a function of the angular difference within the prism of the rays striking the edge 18a and which pass through the center of the lens 20 and those which pass through the periphery of its exit aperture. Given that the ray 28 strikes the entrance face portion 42b substantially along its perpendicular, the angle B formed by the intersection of the prism faces 42 and 54 is substantially equal to the angle A.

The dimensions and angular relationships of the reflective surfaces 46 and 50 are chosen to direct those rays which internally reflect the exit face 54b back onto the exit face substantially along its perpendicular. This perpendicular incidence on the exit face avoids distortion or astigmatism due to refraction of the emerging rays as they pass from the prism to air. By displacing the reflective surface 50 in a direction away from the entrance face 34, and suitably extending the reflective surface 46, it is possible to accommodate a longer focal length lens and a larger film format. This process, however, is limited by considerations of compactness, weight, cost of materials, and loss of light intensity through absorption by the prism material. Similar considerations limit increasing the dimensions of the prism 26 to shift the film plane 18 longitudinally away from the lens 20 to increase the angle A'. It is also possible to increase the angle A' by tilting the exit face with respect to the film plane.

The optically absorbent surfaces of the prisms 24 and 26 serve principally to eliminate unwanted or nonuseful light. This includes both stray rays which enter the prism from outside the normal angular object field of the objective lens as well as light which is scattered, reflected or refracted within the prism structure. For example, light entering the prism 24 at a larger angle of incidence than the ray 30 can be absorbed by the surface 38a upon reflection from the surface 36a or, if it is transmitted through the portion 36b, it may strike the absorbing exit face portion 54a or be reflected and absorbed by the face 48. Similarly, rays entering with an angle of incidence greater than that of ray 32 and entering the prism 26 will be internally reflected by the face 54b so that they strike and are absorbed by the face 52. Similar stray rays with an even larger angle of incidence will be absorbed by the face 40. The light absorbing function of the side surfaces of the prisms 24 and 26 also eliminates stray light from the extreme lateral portions of the object field.

It is important that the prism material have a low dispersion. Suitable materials include crown glass and the acrylic resin material commonly termed plexiglass. Glass is an extremely optically efficient material having for many types a low dispersion and a high index of refraction, usefully in the range of 1.5 to 1.7, which affords a smaller critical angle and therefore can be used to fold the optical path in a more compact volume. Plexiglass, on the other hand, reduces the light transmitted therethrough to a greater extent and has a lower index of refraction, typically in a narrower range around 1.5. As a result, glass is a preferred material high optical quality or extreme compactness are the prime considerations. Plexiglass, however, is the preferred material where weight and cost of manufacture are relevant considerations. It should be noted that plexiglass is desirable from a cost standpoint not only because of the cost of the material itself, but also because it can be fabricated by relatively lower cost molding and finishing techniques. A significant advantage of the invention is that the optical path is so highly folded that it is possible to utilize, with prisms formed from plexiglass, lenses having a relatively long focal length, even allowing for the fact that the plexiglass increases the back focus in air of the lens by approximately one-third.

By way of illustration and not limitation, the following Table I gives representative parameters for the prism 24 and 26 and the rays 28, 30 and 32 where the prism material is plexiglass (index of refraction of 1.5), the film format is 80 millimeters by 80 millimeters, and the objective lens is an f/11 telephoto lens with a 230 millimeter focal length, similar, except for the focal length, to the lens marketed by the Polaroid Corporation for its Pronto! brand of self-developing instant camera.

Table I

| Chief Ray 28 | | Prism 24 | |
| --- | --- | --- | --- |
| Optical Path Length (Typically) | | Angle F | 55° |
| Path Segment 28a | 10mm | Angle G | 97.5° |
| Path Segment 28b | 15mm | | |
| Path Segment 28c | 38.5mm | Prism 26 | |
| Path Segment 28d | 85mm | | |
| Path Segment 28e | 47mm | Angle B | 51.9° |
| Path Segment 28f | 75.5mm | Gap 59 | 0.68mm |
| | | (minimum) | |
| Total | 271mm | | |
| Angle A | 51.9° | | |
| Angle C | 55° | | |
| Angle D | 66° | | |
| Angle E | 64° | | |
| Extreme Ray 30 | | | |
| Angle A' | 41.8° | | |

Figure 3:
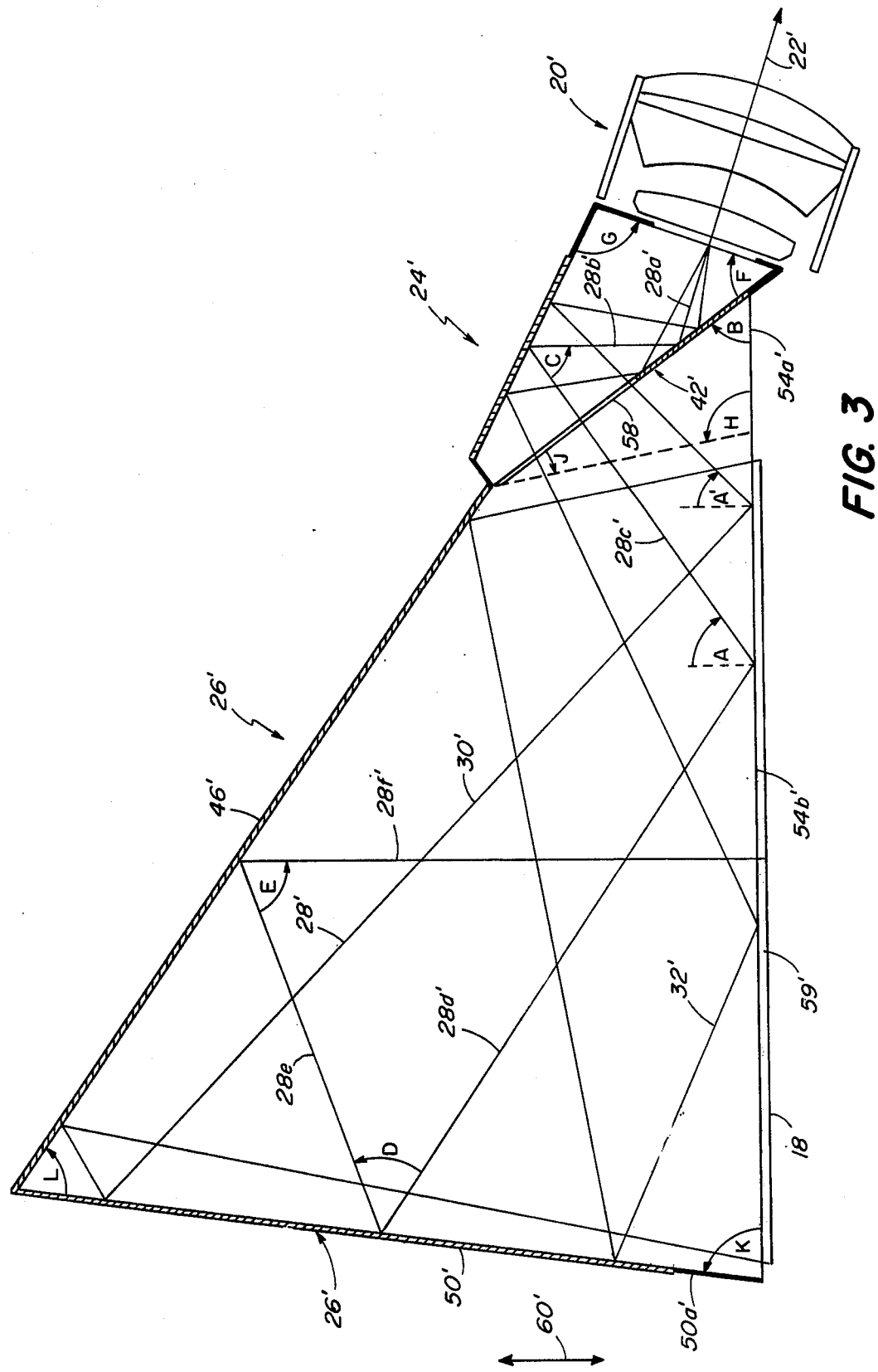
FIG. 3 is a view corresponding to FIG. 2 showing an alternative embodiment of the invention.

FIG. 3 illustrates a modification of the camera 10 as shown in FIGS. 1 and 2 and which achieves a highly folded optical path within an even more compact volume and with a simpler and hence more readily manufactured prism configuration. Elements in FIGS. 1 and 2 bear the same reference numeral in FIGS. 3 plus a prime, thus FIG. 3 depicts a prism 26'. A principal difference between these embodiments is that the absorbing surfaces 44, 48 and 52 of the FIG. 2 prism 26 have been eliminated from the FIG. 3 camera so that the reflecting faces 46' and 50' are contiguous. The prism 26' shown in FIG. 3 therefore has a four-sided, generally wedge-shaped cross section. As in the previous embodiment, the side surfaces are light absorbant and lie slightly beyond the side edges of the film plane to facilitate the folding and eliminate unwanted light. In addition to the light absorbing side faces and the face portion 54a', the prism 26' has a light absorbing face portion 50a' which intercepts stray rays entering the prism with an incidence angle at the exit face portion 54b' that exceeds that of the extreme ray 32'. The prism 24' shown in FIG. 3 is the same as that shown in FIG. 2 except that it is repositioned on the entrance face 42'.

Assuming a film format of 80 millimeters by 80 millimeters, and an index of refraction of approximately 1.5, the maximum height of the prism 26, (as shown) in the direction 60' is approximately 75 millimeters as compared to 93 millimeters for the prism shown in FIG. 2.

For purposes of illustration only, the following Table II gives values for many of the same parameters listed in Table I for a corresponding construction according to FIG. 3. The embodiment of FIG. 3 enhances compactness and design simplicity, at the expense of the focal length. In FIG. 3 the corresponding f/11 objective lens has a focal length of 189 millimeters.

Table II

| Chief Ray 28 | | Prism 24 | |
| --- | --- | --- | --- |
| Optical Path Length (Typically) | | Angle F | 55° |
| Path Segment 28a' | 10mm | Angle G | 97.5° |
| Path Segment 28b' | 15mm | | |
| Path Segment 28c' | 38.5mm | Prism 26 | |
| Path Segment 28d' | 67.5mm | | |
| Path Segment 28e' | 39mm | Angle B | 53.6° |
| Path Segment 28f' | 52mm | Angle H | 98° |
| | | Angle J | 27° |
| Total | 222mm | Angle K | 82° |
| | | Angle L | 62.5° |
| Angle A | 53.6° | | |
| Angle C | 55° | Gap 59' | 0.68mm |
| Angle D | 54° | (minimum) | |
| Angle E | 71° | | |
| Ray 30 | | | |
| Angle A' | 41.8° | | |

Figure 5:
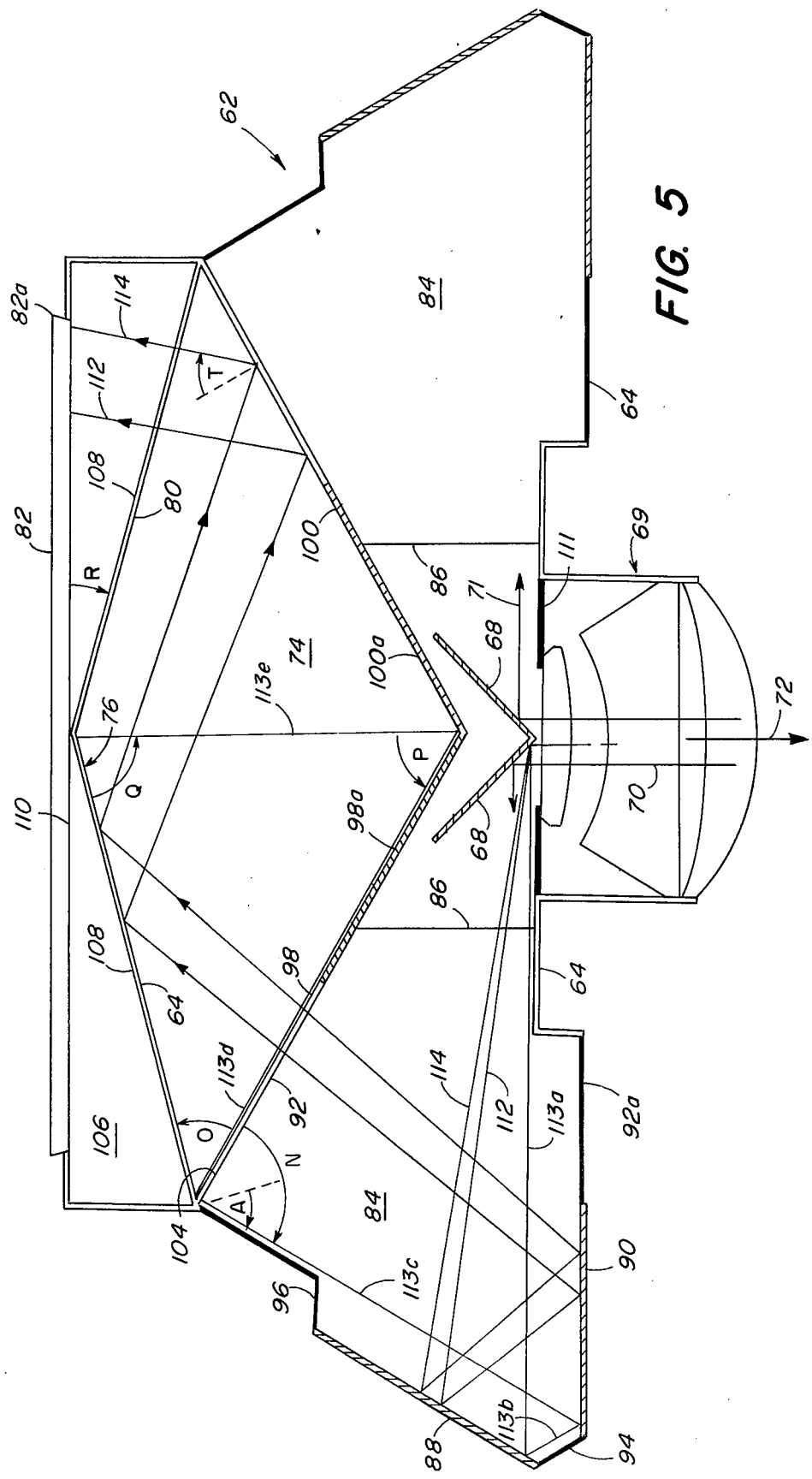
FIG. 5 is a view in horizontal section taken along line 5—5 of FIG. 4 and showing the optical elements and the highly folded optical path they provide.

FIGS. 4 and 5 show another embodiment of the invention in the form of a compact split field prism camera 62. A rigid camera housing 64 which forms a normally light tight exposure chamber 66 mounts a pair of mutually perpendicular mirrors 68 located adjacent the exit surface of an objective lens 69 to split the field into two beams 70 and 71 along the centerline of the camera, which is coincident with the optical axis 72 of the lens. The camera has a generally diamond-shaped beam folding prism 74 that has an exit face 76 formed from a pair of exit surfaces 78 and 80. Each of these surfaces both internally reflect useful light rays and transmits them to a common film plane 82.

More particularly, as FIG. 5 shows, the mirrors direct each beam generally transverse to the optical axis 72 to a prism 84 having an entrance face 86, a first reflecting face 88, a second reflecting face 90, and an exit face 92. The end faces of the prism 84 (i.e. the upper and lower surfaces which extend longitudinal to the plane of FIG. 5 and transverse to the faces shown there), prism faces 94 and 96, and the face portion 92a near the lens to be outside the optical path, are preferably coated with an index-matching optical absorbant.

The prism 74 has a pair of entrance surfaces 98 and 100, each of which has a reflective portion 98a and 100a, respectively adjacent the optical axis 72 and extending in a "vertical" direction 102 (FIG. 4) the full height of the prism 74. There is a thin air gap 104 between the exit faces 92 of prism 84 and the uncoated portions of the prism 74 entrance surfaces 98 and 100. An emergent prism 106 is located between the exit faces 78 and 80 of the prism 74 and the film plane. The entrance face 108 of the prism 106 is a pair of mutually inclined surfaces and that are closely spaced by an air gap from the exit surfaces of the prism 74. (The air gaps along the faces of the prism 74 are preferably about 0.025 mm (0.001 inch) wide). An exit face 110 of the prism is parallel to and closely spaced from the film plane. The exit face 110 is preferably optically finished, has an anti-reflection film and is coextensive with the film plane. The emergent prism 106 aids in recomposing the split beams in the image plane without a dark or bright line or band appearing down the middle of the film plane along the optical axis 72 which would otherwise be caused by the unequal refraction of the light rays emerging from the inclined exit surfaces 78 and 80 of the prism 74. It shuld be noted that the prism 106 can be formed from two separate prism units joined along the optical axis 72 at their narrow prism faces. In addition, prism 106 can be made significantly thinner than shown (a smaller angle R) provided that the camera is made sufficiently wider.

This prismatic structure in the camera of FIGS. 4 and 5 forms optical image paths as follows. Useful light rays from within the angular field of the objective lens are split by the mirrors 68, 68 into two light beams 70 and 71 each carrying an image from its own one half of the object field. A diaphragm 111 interposed between the lens and the mirrors defines the exit aperture and preferably the real stop of the objective. As shown, representative rays 112, 113 and 114 of the beam 70 enter the prism 84 substantially perpendicular to the entrance face 86, and are successively reflected from the surfaces 88 and 90 so that they strike the entrance and exit faces 92 and 98 substantially along their perpendiculars. Within the prism 74 the light rays undergo two reflections that direct them to the exit surface 80 generally along its perpendicular, so that each is transmitted through the prism 106 to the film plane 82 where it exposes a film unit held in a film cassette 116 (FIG. 4). The first reflection in prism 74 is a total internal reflection at the exit surface 78. The second reflection is also a total internal reflection for the ray 114, which strikes the edge 82a of the film plane 82. The second reflection for the rays 112 and 113, however, is from the reflectively coated portion 100a.

The lateral dimension of the reflectively coated face portions 98a and 100a depend on several factors such as the objective lens, the prism index of refraction and configuration and the picture format. While these factors are interrelated, the nonreflective portions of the faces 98 and 100 must receive all the useful rays transmitted from the prisms 84 and each must also reflect all useful rays reflected from the reflective/transmissive exit face surfaces 78 and 80.

Further, as with the embodiments discussed with respect to FIGS. 1–3, the configuration and dimensions of the prisms 84 and 74 vary with the film format, prism material and lens parameters to ensure the total internal reflection and transmission of all useful light rays at the exit surfaces 78 and 80.

The optical system of the camera provides a highly folded optical path in a small volume. In particular, this optical system provides a self-developing type camera which has a relatively small front-to-back dimension and accommodates a lens having a sufficiently long focal length to take portrait photographs.

By way of illustration only, Table III gives the parameters describing the optical system of the cameras shown in FIG. 5 and assuming a film format of 80 millimeters by 80 millimeters, an f/11 telephoto lens system having a focal length in air of approximately 158 millimeters, and prisms formed of lanthanum crown glass having an index of refraction of approximately 1.70.

Table III

| Extreme Ray 113 | | Diaphragm 111 | |
|---|---|---|---|
| Optical Path Length (Typically) | | Clear aperture | |
| Path Segment 113a | 69.0 | radius of exit pupil | 5.6mm |
| Path Segment 113b | 5.0 | | |
| Path Segment 113c | 42.4 | Prism 84 | |
| Path Segment 113d | 52.6 | | |
| Path Segment 113e | 38.5 | Angle M | 45° |
| Total | 207.5mm | Angle N | 90° |
| Angle A | 45° | Prism 74 | |
| Angle S | 60° | | |
| | | Angle O | 45° |
| | | Angle P | 60° |
| | | Angle Q | 75° |
| Extreme Ray 114 | | | |
| Angle T | 40.4° | | |
| | | Prism 106 | |
| | | Width of Exit Face 100 | 91 mm |
| | | Angle R | 15° |

Figure 6:
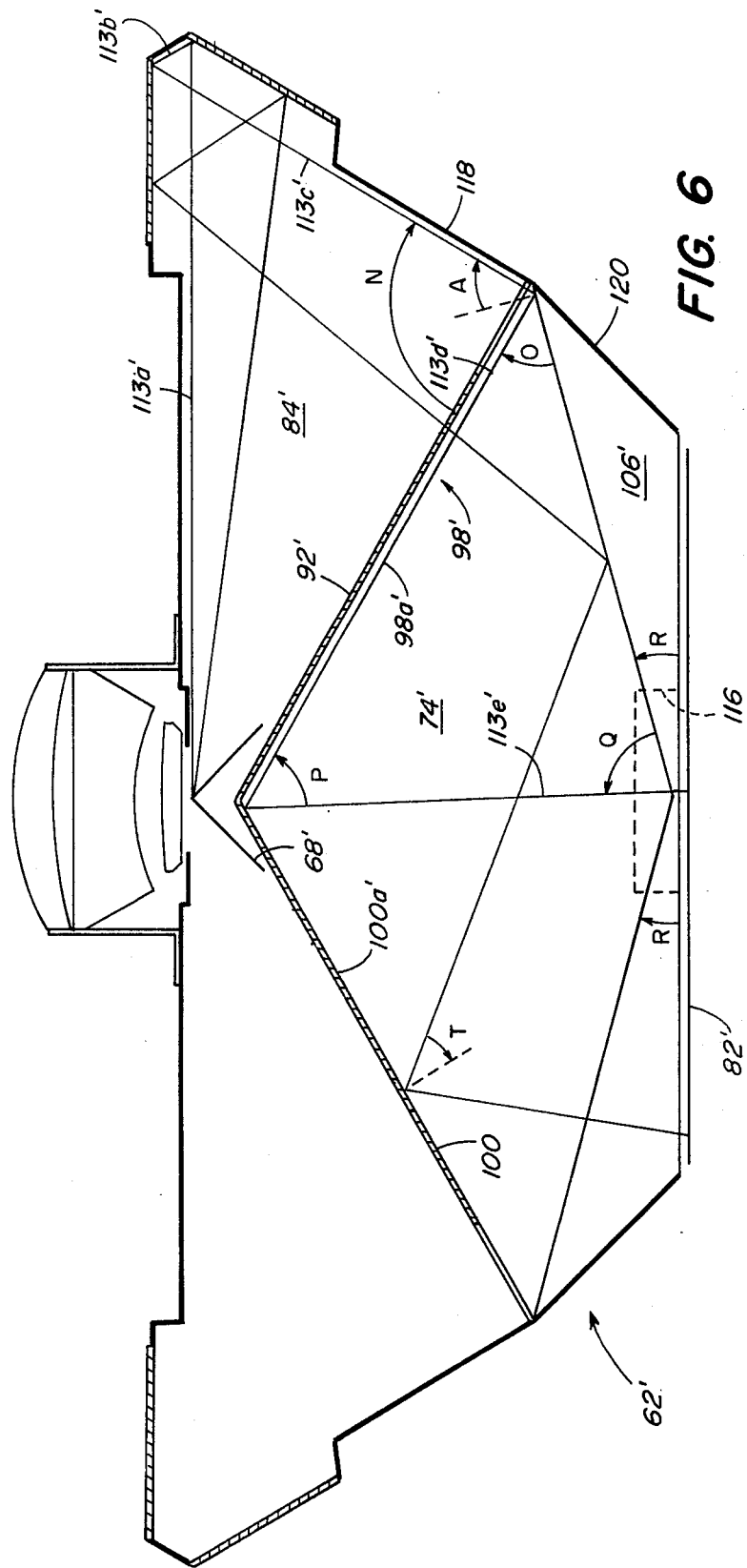
FIG. 6 is a view corresponding to FIG. 5 showing an alternative embodiment of the invention where the prism elements are of plastic material.

FIG. 6 illustrates an embodiment of the camera 62 in which the prisms are plexiglass. As noted with respect to the embodiments in FIGS. 1–3, although plexiglass has a relatively low index of refraction and is otherwise less optically different than glass, it has significant weight and cost advantages which can make it a preferred material. The construction and operation of the prism system shown in FIG. 6 is essentially the same as that described above with respect to FIG. 5 and corresponding elements are indentified with the same reference number as used in FIGS. 4 and 5 except they are primed. One difference in these embodiments is that the lower index of refraction of the plexiglass in this instance accommodates a longer focal length lens resulting from the larger critical angle at n=1.5. Another difference is that reflections from the faces 98' and 100' are exclusively by means of reflection coatings on the portions 98a' and 100a'. Since the uncoated portions of faces 98' and 100' are not used for total internal reflections, they can be secured directly, i.e. without an intervening air gap, to the mating faces 92' of the prism 84' with an index-matching cement.

In order to facilitate recomposing the two image beams at the film plane, a vertically rectangular portion of the prisms 74' and 106' adjacent the film plane at the line of recomposition can be a separate, continuous block 116 (shown in phantom) of plexiglass which is secured to the prisms by a suitable index matching cement. The block 116 should extend the full height of the prisms and can extend laterally a sufficient distance so as not to interfere with the internal reflection of useful light rays from the prism faces 98' and 100'. As in embodiments previously discussed, it will be understood that the top and bottom prism surfaces are coated with an optical absorbant, as are the lateral prism surfaces 118 and 120.

Table IV sets forth one illustrative set of design parameters for the prism system shown in FIG. 6 assuming an 80 millimeter by 80 millimeter film format, a prism index of refraction of 1.5, and an f/11 telephoto objective lens with a focal length of approximately 225 millimeters.

Table IV

| Extreme Ray 113' | | Prism 84 | |
|---|---|---|---|
| Optical Path Length | | Angle M | 45° |
| Path Segment 113a' | 87mm | Angle N | 90° |
| Path Segment 113c' | 52mm | | |
| Path Segment 113d' | 67.5mm | Prism 74 | |
| Angle A | 45° | Angle O | 45° |
| | | Angle P | 60° |
| | | Angle Q | 75° |
| Extreme Ray 114' | | | |
| Angle T | 38.5° | Prism 106 | |
| | | Angle R | 15° |

While Tables I–IV specify illustrative sets of values for embodiments of the invention, there is a degree of latitude in these values which translates into relatively low manufacturing tolerances and a range of design choices to accommodate variations in factors such as the size, configuration, and weight of the camera, the orientation and parameters of the objective lens, and the film format. In the split field camera of FIGS. 4–6, however, it has been found that the angle P between the optical axis and each face 98 and 100 should preferably be a minimum of 60°. A wider angle will result in a wider prism and hence in a camera which is less compact and heavier, as well as in a separation of the two halves of the format. A smaller angle will generally result in some loss of useful rays and an unsatisfactory overlap of the two halves of the format. One advantage of this invention is that the camera can be readily adapted to accommodate a relatively large, wide format. For example, in any of the foregoing embodiments the lateral dimensions of the prisms can be extended (with suitable adjustments in the lens and other components) to expose film having an 80 millimeter by 120 millimeter format.

Figure 7:
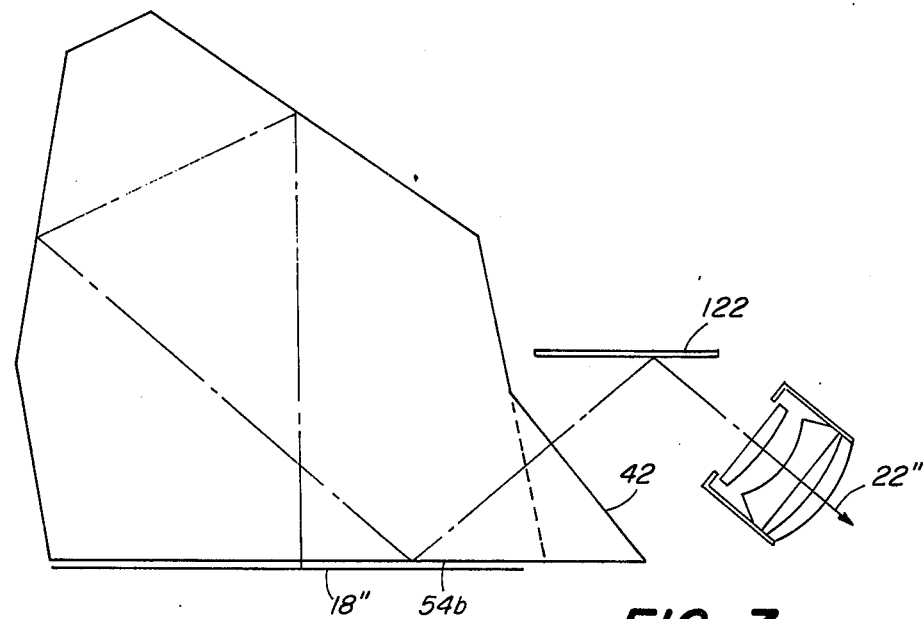
FIGS. 7 and 8 are views corresponding to FIGS. 2 and 5, respectively, and showing alternative embodiments of the invention in which the light emergent from the objective lens undergoes an even number of reflections before reaching the film plane.
Figure 8:
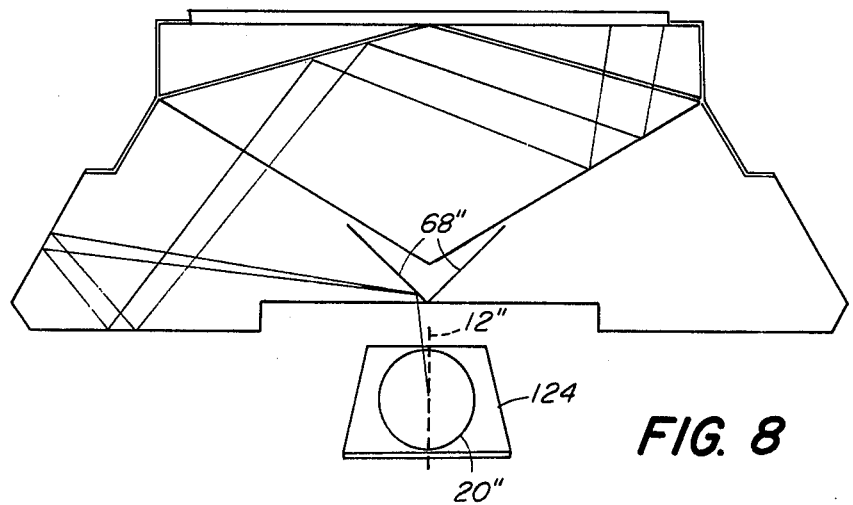

The optical systems in FIGS. 1–6 subject light to an odd number of reflections, which is appropriate for self-developing film of the type currently marketed by the Polaroid Corporation. FIGS. 7 and 8, on the other hand, illustrate simplified embodiments of modifications of the optical systems shown in FIGS. 3 and 5, respectively, for use with self-developing film units which require an even number of light reflections. As shown in FIG. 7, the objective lens 20" has its optical axis 22" aligned with respect to a mirror 122 and the entrance face 42" of the prism 26" so that light rays enter the prism 26 substantially along a perpendicular to the entrance face 42" and are internally reflected from prism face 54b" overlying the film plane 18". In FIG. 8 a mirror 124 angled at 45° with respect to the optical axis 72" introduces an extra reflection to light emerging from the objective lens 69" oriented perpendicular to the axis 72" before it is split by the mirrors 68".

It is also contemplated that for an odd number of reflections with the embodiments shown in FIGS. 1-3, the initial ray-orienting prism 24 can be eliminated provided the optical axis of the objective lens is placed in direct optical alignment with the entrance face of the prism 26. These and similar modifications offer a wide degree of flexibility in the practice of the invention as set forth above.

There has been described a compact, rigid camera that utilizes a prism within the exposure chamber to provide a reflective and transmissive surface overlying the film plane. This structure achieves a highly folded optical path in a relatively small volume. One advantage of the design is that it provides a camera for use with self-developing film having a relatively large film format. Another advantage of the invention is that a relatively long focal length objective lens with an acceptable numerical aperture for use in instant photography can be employed. In particular, cameras constructed according to the invention can be used for portrait photographs. The cameras can also be manufactured of plastic materials to have relatively low weight and cost. Also the prisms and the other optical elements have few critical dimensional tolerances or optical alignments, which reduces the cost of manufacture.

While the invention has been described with respect to preferred embodiments, and various alternatives and modifications have been described, other modifications and variations will become apparent to those skilled in the art from the foregoing detailed description and accompanying drawings. Such modifications are intended to fall within the scope of the appended claims.

What is claimed as new and secured by Letters Patent is:

1. A compact camera for producing an image of an object on film having its photosensitive surface coincident with a film plane, said camera having the improvement comprising
    A. a housing enclosing an exposure chamber,
    B. a lens arrangement mounted on said housing for focusing at said film plane light from within a selected angular field of view, and
    C. optical means within said exposure chamber for forming a folded optical path between said lens arrangement and said film plane, said optical means including a prism arrangement having a first surface in lightreceiving optical alignment with said lens arrangement, a second face overlying and spaced from said film plane and in optical alignment with said first surface for receiving and redirecting by total internal reflection light incident along said optical path and entering said prism arrangement through said first surface, at least one additional surface oriented in optical alignment with said second face for receiving and reflecting said internally-reflected light back onto said second face substantially transverse thereto for transmission through said second face to said film plane, said first surface receiving entering light from a first portion of said angular field, said additional surface also receiving light from another portion of said angular field, different from said first portion and reflecting said light from said other portion to said first surface, and said first surface reflects such light reflected thereto from said additional surface to said second face for transmission to said film plane.

2. In a compact camera for producing an image of an object on film having its photosensitive surface coincident with a film plane, said camera having a housing enclosing an exposure chamber, and a lens arrangement mounted on said housing for focusing at said film plane light from within a selected angular field of view, the improvement comprising:
    optical means within said exposure chamber for forming a folded optical path between said lens means and said film plane, said optical means including a prism arrangement having a first face in light-receiving optical alignment with said lens arrangement, a second face overlying and spaced from said film plane and in optical alignment with said first face for receiving and redirecting by total internal reflection light incident along said optical path and entering said prism arrangement through said first face, a third face oriented in optical alignment with said second face for receiving and further reflecting said internally-reflected light therefrom, and a fourth face oriented in optical alignment with said third face for receiving and reflecting said internally-reflected light therefrom back to said second face substantially transverse thereto for transmission through said second face to said film plane.

3. A compact camera for producing an image of an object on self-developing film having a photosensitive surface lying in and coextensive with a film plane oriented generally perpendicular to a first direction, said camera comprising in combination:
    A. a housing that encloses an exposure chamber,
    B. a housing-mounted lens arrangement for focusing at said film plane light from said first direction within the angular field of view of said lens arrangement, and
    C. optical means located within said exposure chamber for defining a folded optical path for said light between said lens arrangement and said film plane, said optical means including a first prism having a first entrance face in light-receiving optical alignment with said lens arrangement, a second face overlying and spaced from said film plane and located to receive light incident on said first face and reflect it internally, and at least one additional face that reflects said light back onto said second face so that it is transmitted through said second face to said film plane, said prism having a maximum direction measured along said first direction less than the maximum linear dimension of said film plane, said second face having two planar, mutually inclined surfaces each of which is both reflective and transmissive to said light.

4. A compact camera according to claim 3 wherein said optical means includes an emergent prism having an entrance face closely spaced from said second face and an exit face closely spaced from said film plane.

5. A compact camera according to claim 4 wherein said optical means further comprises means for splitting said light emergent from said lens arrangement into two beams, and second and third prisms each having an entrance surface in optical alignment with said beam splitting means and an exit surface, the exit surface of said second prism transmitting said light to said entrance face substantially along its perpendicular and the exit surface of said third prism transmitting said light to said additional reflective face substantially along its perpendicular for transmission to one of said reflective and transmissive surfaces where it is totally internally reflected to said entrance face for reflection to said other reflective and transmissive surface for transmission to said film plane.

6. A compact camera for producing an image of an object on self-developing film having a photosensitive surface lying in and coextensive with a film plane oriented generally perpendicular to a first direction, said camera comprising in combination:

A. a housing that encloses an exposure chamber,

B. a housing-mounted lens arrangement for focusing at said film plane light from said first direction within the angular field of view of said lens arrangement, and C. optical means located within said exposure chamber for defining a folded optical path for said light between said lens arrangement and said film plane, said optical means including a first prism having a first entrance face in light-receiving optical alignment with said lens arrangement, a second face overlying and spaced from said film plane and located to receive light incident on said first face and reflect it internally, and at least one additional face that reflects said light back onto said second face so that it is transmitted through said second face to said film plane, said prism having a maximum direction measured along said first direction less than the maximum linear dimension of said film plane, said optical means including a second prism having an entrance surface in optical alignment with said lens arrangement and an exit surface that transmits said light to the entrance surface of said first prism substantially along its perpendicular.

* * * * *